Figure 1:
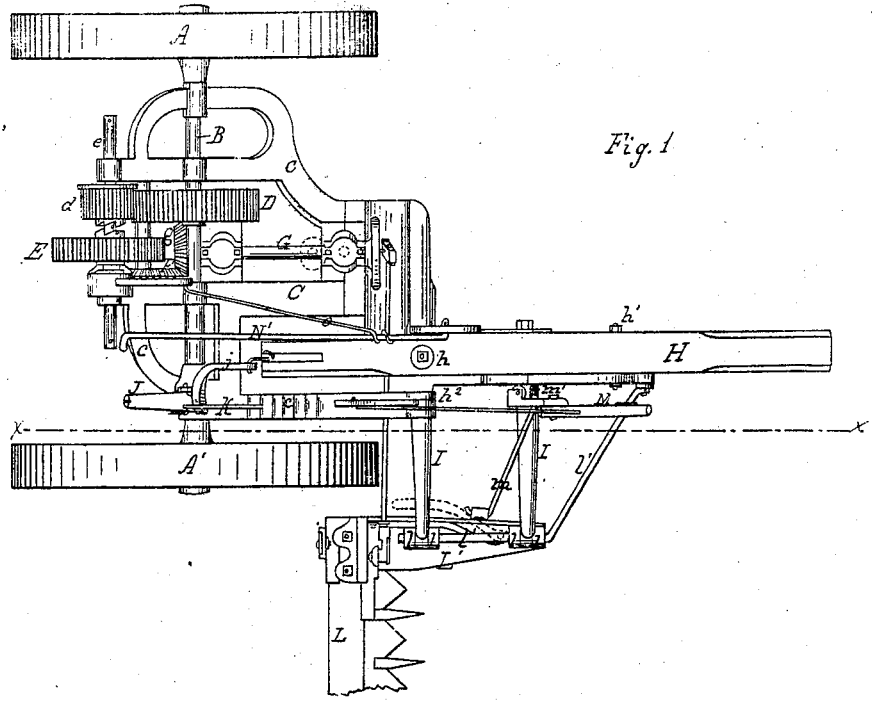

F. Nishwitz.
Mower.

No. 95372. Patented Sep 28, 1869.

Witnesses
Joel D. Peyton
Baltis DeLong

Inventor
F. Nishwitz
by his Atty
Wm. D. Baldwin

F. Nishwitz.
Mower.
N° 95372    Patented Sep. 28, 1869.
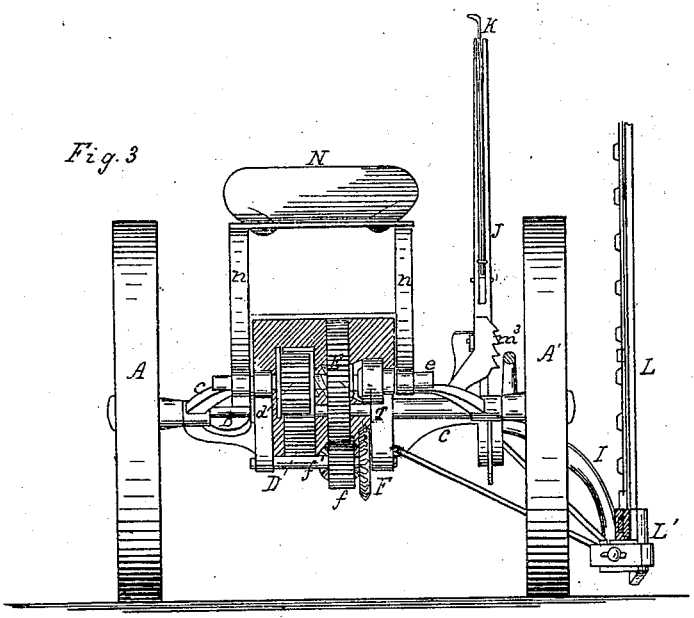
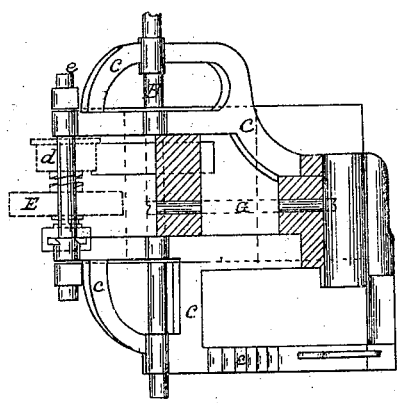
Witnesses                                        Inventor

UNITED STATES PATENT OFFICE.

FREDERICK NISHWITZ, OF BROOKLYN, NEW YORK.

IMPROVEMENT IN HARVESTERS.

Specification forming part of Letters Patent No. 95,372, dated September 28, 1869.

*To all whom it may concern:*

Be it known that I, FREDERICK NISHWITZ, of Brooklyn, in the county of Kings and State of New York, have invented certain new and useful Improvements in Harvesters, of which the following is a full, clear, and exact description:

My invention relates to that class of harvesters known as two-wheeled front-cut machines, having a main frame vibrating about a main axle.

The object of my invention is to allow the cutting apparatus, tongue, or draft-frame and gear-frame, each to vibrate freely, without interfering with the harmonious co-operation of the mechanism; and The improvement consists, first, in combining a vibrating gear-frame, a vibrating tongue, a finger-beam, hinged to the tongue or draft-frame, and a vibrating lifting-lever, connected with the rear end of the tongue by a loop or link, which prevents the descent of the front of the gear-frame below a given point, but allows it to rise freely; second, in combining a vibrating main frame and a vibrating tongue or draft-frame, with a cutting apparatus hinged to the tongue or draft-frame only, and by one end only; third, in combining a vibrating gear-frame, and a vibrating tongue or draft-frame, with down-hangers attached to the tongue, and to which the finger-beam is hinged; fourth, in combining a gear-frame, vibrating about the main axle, with a tongue or draft-frame vibrating on the gear-frame, on an axis coincident with that of one of the down-hangers, to which the finger-beam is pivoted; fifth, in combining a vibrating gear-frame and a vibrating tongue or draft-frame with a cutting apparatus hinged to the tongue, and with a pitman in or nearly in the line of the joint of the tongue; sixth, in combining a vibrating gear-frame with a hinged cutting apparatus, connected with a vibrating plate or bracket, to which the tongue is secured; seventh, in combining a hinged cutting apparatus, pivoted to down-hangers or coupling-arms, vibrating with the tongue or draft-frame, with a brace secured to the tongue or draft-frame and forming the pivot of the hinge; eighth, in combining a hinged finger-beam and tongue or draft-frame, vibrating in unison, with a lever and thrust-link on the draft-frame, to elevate the divider end of the finger-beam; ninth, in combining, with a hinged finger-beam, a tilting-lever, pivoted on the front coupling-arm, and connected with the shoe by a link, for the purpose of raising or lowering the divider end of the cutting apparatus; tenth, in combining a hinged finger-beam and a tilting-lever, mounted on the tongue or draft-frame, with a yielding stop or flexible connection, which limits the descent of the divider end of the finger-beam; eleventh, in combining the pivoted shoe and its link with a tilting-lever, mounted on the tongue or draft-frame, and provided with a friction-roller running on the tongue-plate, to relieve the lateral thrust on the lifting-lever; twelfth, in combining a shoe, rigidly secured to the finger-beam, and projecting in advance thereof, with a supplementary adjustable spring-shoe, secured by a slot and set-screw, at the heel of the shoe, and with its front end secured on the pivot on which the shoe vibrates; thirteenth, in arranging a gear-frame, vibrating on the driving-axle, and a tongue or draft-frame vibrating on the gear-frame, with a finger-beam secured to a long shoe, projecting in advance of the finger-beam and pivoted to down-hangers on the tongue or draft-frame; fourteenth, in combining a gear-frame, a tongue, and a driver's seat, all vibrating on parallel pivots, with a link connecting the driver's seat and tongue, so that they shall vibrate in unison.

In the accompanying drawings, all my improvements are represented as embodied in a single machine. It is obvious, however, that some of the improvements may be used without the others, and may also be adapted to machines differing in construction from that herein shown.

Figure 2:
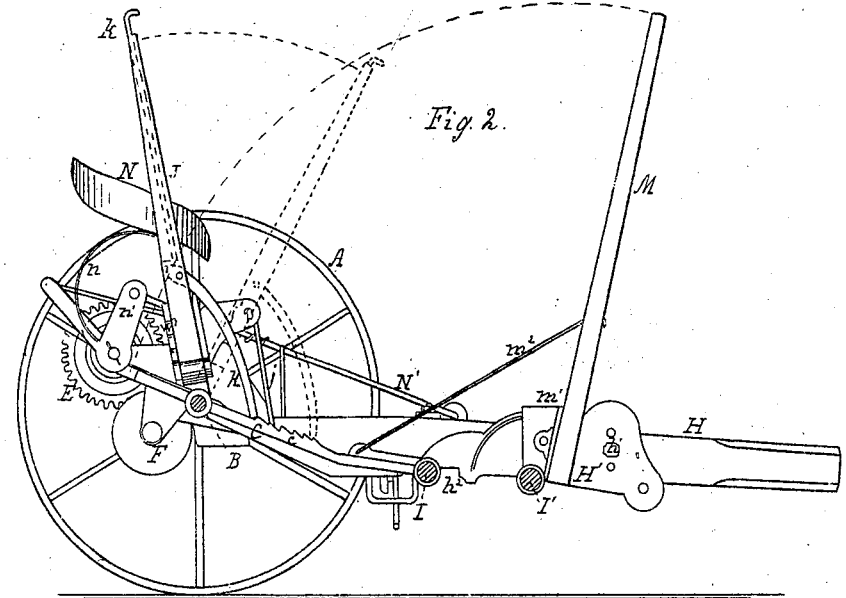

Figure 1 represents a plan or top view of my improved machine. Fig. 2 represents a vertical longitudinal section through the same, at the line *x x* of Fig. 1. Fig. 3 represents a view, in elevation, of the same, as seen from the rear, with the cutting apparatus folded up vertically; and Fig. 4, a plan view of the gear-frame; Fig. 5, a front view, and Fig. 6 a plan view, of a portion of the pitman and cutter detached, showing the details of their construction.

In this instance, two main driving and supporting-wheels, A A', turn loosely on a common axle, B, with which they are connected by backing-ratchets of any usual well-known construction. The axle revolves in pipe-bearings in a cast-metal frame, C, arranged between the wheels, and projecting mostly in front of the axle B. A spur-wheel, D, keyed fast on the main axle, drives a spur-pinion, $d$, on a counter-shaft, $e$, behind and above the main axle. A spur-wheel, E, on this shaft, drives a corresponding pinion, $f$, on a shaft, $f'$, parallel with and below the counter-shaft. A bevel-wheel, F, on this shaft, drives a corresponding pinion, $g$, on a crank-shaft, G, driving the cutters by a crank and pitman in the usual way.

A tongue, H, is secured by a bolt, $h$, to a plate, H', upon which it may be adjusted up or down by a bolt, $h^1$, taking into one of a series of holes in the front of the plate. A socket, $h^2$, on the rear end of this plate, fits on a pivot, I, on the front of the gear-frame, so as to allow the tongue to play freely vertically. The tongue extends back of its pivot I, and its rear end is slotted vertically. A transverse pin in this slot is embraced by a loop, $j$, attached to an arm, $j'$, on a lifting-lever, J, pivoted on the main axle B.

A pawl, K, pivoted on the lifting-lever, takes into ratchets $c$, on the gear-frame, to hold the gear-frame at any desired elevation. This pawl is released by backing the lever slightly, and then shoving down a rod, $k$, sliding endwise in a groove in the lifting-lever, and bearing on the rear end of the pawl.

The finger-beam L is fastened securely at its heel end to a shoe, L', which extends much further in front of the finger-beam than usual, and is provided with lugs $l$, between which down-hangers or coupling-arms I I' are pivoted by a rod, $l'$, which is bent up at its forward end, and bolted to the front end of the tongue-plate H', thus serving both as a pivot and a brace.

The rear coupling-arm I, it will be observed in this instance, is inserted in a socket in the front of the gear-frame, and is likewise secured to the rear end of the tongue-plate, and forms the pivot on which the tongue vibrates. The front coupling-arm and brace $l'$ are likewise secured to and vibrate with the tongue-plate. By this mode of construction, the raising and lowering of the tongue correspondingly vibrates the shoe, and thus varies the angle of the guards relatively to the ground.

A link, $m$, is pivoted at its lower end to the shoe L, outside of and below its pivot $l'$, while its upper end is attached to a lever, M, vibrating vertically on the front coupling-arm I'. By drawing back this lever, the link $m$ swings the shoe around its pivot $l'$, and thus lifts the divider end of the finger-beam.

A friction-roller, $m^1$, on the lever-plate, traverses on the tongue-plate, and prevents the friction of the tilting-lever against the tongue.

A cord, or chain, $m^2$, is secured at one end to the main frame, and at the other to the lever M. This cord limits the forward movements of the lever M, and, consequently, prevents the divider end of the finger-beam from falling below a given point, while leaving it free to rise and move the lever backward. When the finger-beam is vertical, the lever M takes into notches $m^3$, on the back of the lifting-lever, and is firmly held there.

A seat, N, for the driver, is mounted on standards $n$, pivoted to vibrate on the counter-shaft $e$. An arm, $n'$, fixed on one of the standards, is connected by a link, N', with the tongue-plate in front of and above the pivot I. The seat is thus moved back and forth, when the gear-frame is raised or lowered by the hand-lever J.

The shipping-lever is operated by a link, O, coiled around the rod N', so as to be pushed backward or forward by the driver's foot, to throw the mechanism into or out of gear.

What I claim as my invention, and desire to secure by Letters Patent, is—

1. The combination of a gear-frame, vibrating on the main axle, a tongue or draft-frame, vibrating on the gear-frame, finger-beam hinged to the tongue or draft-frame, and a lifting-lever, connected with the rear end of the tongue by a link, which allows the finger-beam to rise, but limits its descent below a given point, substantially as set forth.

2. The combination of a main frame vibrating on the driving-axle, and a tongue or draft-frame vibrating on the gear-frame, with a cutting apparatus hinged to the tongue or draft-frame, by one end only, substantially as set forth.

3. The combination of a vibrating gear-frame and a vibrating tongue or draft-frame, with a down-hanger attached to the tongue, and to which the finger-beam is hinged, substantially as set forth.

4. The combination of a gear-frame, vibrating about the main axle, with a tongue or draft-frame vibrating on an axis coincident with that of one of the down-hangers or coupling-arms to which the finger-beam is pivoted.

5. The arrangement, as set forth, of the vibrating gear-frame, vibrating draft-frame or tongue, finger-beam hinged to the tongue, and the pitman, arranged nearly in the line of the joint of the tongue, to allow the cutting apparatus to vibrate without injuriously disturbing the relation of the cutters to the guards.

6. The combination of the hinged cutting apparatus with the vibrating tongue-plate, in the manner described.

7. The combination of a hinged cutting apparatus, pivoted to down-hangers, vibrating with the tongue or draft-frame, with a brace secured to the tongue or draft-frame, and forming the pivot of the hinge, substantially as set forth.

8. The combination, with a hinged finger-beam and tongue or draft-frame, vibrating in unison, of a thrust-link and a lever, mounted on the tongue or draft-frame, substantially as and for the purpose set forth.

9. The combination of the hinged finger-beam with the tilting-lever pivoted on the front coupling-arm, and connected with the shoe by a link, to lift the divider end of the finger-beam, substantially as set forth.

10. The combination, with the hinged finger-beam, of the tilting-lever, mounted on the tongue or draft-frame, with the restraining-cord or chain secured to the gear-frame, as set forth.

11. The combination of the pivoted shoe and its link with the tilting-lever and friction-roller, for the purpose specified.

12. The combination, with the shoe to which the finger-beam is fastened, of the supplementary spring-shoe pivoted concentrically with the supporting-shoe in front, and adjustable at its heel end, as set forth.

13. The arrangement, as set forth, of the vibrating gear-frame, vibrating tongue or draft-frame, and hinged finger-beam, with the down-hangers and long shoe.

14. The combination of the gear-frame, tongue, and driver's seat, all vibrating on parallel pivots with a link connecting the driver's seat and tongue or draft-frame, substantially as set forth.

In testimony whereof, I have hereunto subscribed my name.

F. NISHWITZ.

Witnesses:
G. GRANDY,
HENRY GECKLER.